(12) United States Patent
Chou

(10) Patent No.: US 9,441,100 B2
(45) Date of Patent: Sep. 13, 2016

(54) BLENDS OF ETHYLENE COPOLYMERS WITH HIGH-FREQUENCY WELDABILITY

(71) Applicant: E I DU PONT DE NEMOURS AND COMPANY, Wilmington, DE (US)

(72) Inventor: Richard T Chou, Hockessin, DE (US)

(73) Assignee: E. I. DU PONT DE NEMOURS AND COMPANY, Wilmington, DE (US)

( * ) Notice: Subject to any disclaimer, the term of this patent is extended or adjusted under 35 U.S.C. 154(b) by 0 days.

(21) Appl. No.: 14/575,057

(22) Filed: Dec. 18, 2014

(65) Prior Publication Data

US 2015/0175788 A1 Jun. 25, 2015

Related U.S. Application Data

(60) Provisional application No. 61/918,701, filed on Dec. 20, 2013.

(51) Int. Cl.
*C08L 23/08* (2006.01)

(52) U.S. Cl.
CPC .................................. *C08L 23/0869* (2013.01)

(58) Field of Classification Search
None
See application file for complete search history.

(56) References Cited

U.S. PATENT DOCUMENTS

| | | |
|---|---|---|
| 2,897,183 A | 7/1959 | Christl et al. |
| 3,350,372 A | 10/1967 | Anspon et al. |
| 3,756,996 A | 9/1973 | Pugh et al. |
| 3,972,961 A | 8/1976 | Hammer et al. |
| RE30,754 E | 9/1981 | Hammer et al. |
| 4,351,931 A | 9/1982 | Armitage |
| 5,028,674 A | 7/1991 | Hatch et al. |
| 5,532,066 A | 7/1996 | Latiolais et al. |
| 7,879,949 B2 | 2/2011 | Chou |
| 7,935,765 B2 | 5/2011 | Chou |
| 2003/0021945 A1 | 1/2003 | Kelch |
| 2005/0187315 A1 | 8/2005 | Dean |
| 2005/0255328 A1 | 11/2005 | Chen et al. |

FOREIGN PATENT DOCUMENTS

WO 02/102898 A1 12/2002

*Primary Examiner* — Jeffrey Mullis

(57) ABSTRACT

Disclosed are high frequency-active blends comprising (a) ethylene copolymers with polar comonomers such as ethylene/vinyl acetate copolymers, ethylene/alkyl (meth)acrylate copolymers and ethylene/(meth)acrylate/carbon monoxide terpolymers; (b) copolymers of ethylene and maleic anhydride or its functional equivalents and (c) a short chain polymer containing one primary amine, the remainder comprising propylene oxide, ethylene oxide, or mixture thereof; and films, powders, multilayer structures, and articles prepared therefrom.

14 Claims, No Drawings

BLENDS OF ETHYLENE COPOLYMERS WITH HIGH-FREQUENCY WELDABILITY

CROSS REFERENCE TO RELATED APPLICATION

This application claims priority under 35 U.S.C. §119(e) from U.S. Provisional Patent Application No. 61/918,701, filed Dec. 20, 2013, hereby incorporated herein by reference in its entirety.

FIELD OF THE INVENTION

This invention relates to high frequency-active blends of copolymers of ethylene with polar comonomers and functionalized copolymers and films, powders, multilayer structures, and articles prepared therefrom.

BACKGROUND OF THE INVENTION

Polyolefin polymers are in general hydrophobic. Polarity of an ethylene based polymer can be obtained by copolymerization of ethylene and a polar monomer such as vinyl acetate, alkyl acrylate, (meth)acrylic acid, etc. via a free radical polymerization process. Ethylene copolymers such as ethylene vinyl acetate and ethylene alkyl acrylate copolymers are widely used in industry due to their diverse properties, low cost, and broad availability. As the polar comonomer content increases, desirable properties such as adhesion, flexibility, and optical clarity improve. However, there are trade-offs. As the vinyl acetate content increases in copolymers of ethylene and vinyl acetate both the melting temperature and the crystalline content drop accordingly. This imposes a restriction on the usage for applications where physical integrity is needed up to a specific temperature, such as 80° C. Also an ethylene copolymer with a low melting point and low crystallinity as indicated from the heat of fusion is difficult to manufacture due to its stickiness and softness, resulting in blocking. Furthermore, an ethylene copolymer even containing a large amount of polar monomers may still be deficient in some key performance that limits its usage.

Thus it is desirable to obtain more polar polymeric compositions that overcome the thermal deficiencies of ethylene copolymers with high polar comonomer content and provide improved properties that arise from their higher polarity. For example, ethylene/vinyl acetate and ethylene/alkyl acrylate copolymers have to be modified to provide HF activated welding.

High frequency (HF) or radio frequency (RF) welding is useful in flexible packaging, flexible bag production, textile lamination, and in producing automotive components such as headliners and sunvisors. HF welding is an alternative to heat-bonding methods for adhering a film to a substrate such as the film itself, another film, or a textile fabric. HF welding involves heating only a HF-active component or HF-active layer of a structure such as a multilayer film sufficiently to soften that component. The selective heating is accomplished by treatment with high frequency radiation. In contrast, heat-bonding methods require transferring heat through an entire structure to soften a bonding layer or component in the structure. In each case, the softened layer or component subsequently bonds the film structure to a substrate.

HF welding can be advantageous over heat-bonding methods. First, HF welding can bond a film in a fraction of the time required for heat-bonding methods. Second, HF welding is less likely to degrade thermally sensitive materials, such as oriented films and thermally sensitive dyes. Third, bonding complex shapes is possible using HF welding.

Flexible polyvinyl chloride (f-PVC) has been used in HF-active films due to its HF sealing capability, vapor and gas barrier properties, and flexibility. Films of f-PVC typically include a plasticizer, typically a phthalate plasticizer, to enhance film flexibility. The plasticizer can migrate out of the polymer over time, decreasing film flexibility and potentially contaminating materials in contact with the film. A desire for long-term flexibility and concern about the environmental impact of halogenated polymers, such as f-PVC, make it desirable to have other HF-active polymers as an alternative to f-PVC.

Olefin/acrylate copolymers and olefin/vinyl ester copolymers demonstrate some HF activity when they contain greater than about 12 weight percent of a polar comonomer such as alkyl acrylate or vinyl ester. Such a high level of polar comonomer reduces a polymer's crystalline melting point ($T_m$) below 100° C., and generally below 90° C. Polymers having such a low $T_m$ are not suitable for use in many articles where a film must maintain physical integrity through multiple exposures to temperatures around, and particularly above, 100° C. Examples of such articles include many textiles, such as clothing articles, which are subject to repeated washing and drying cycles. Additional examples of such articles include sun visors for automotive interiors. Olefin/acrylate and olefin/vinyl ester copolymers also tend to have a lower dielectric loss factor (DLF) than f-PVC. A lower DLF means more HF energy is necessary to weld the copolymers with HF than needed for f-PVC. Addition of HF-active fillers can help increase the DLF of a copolymer film, but may do so at the expense of physical properties such as tensile strength.

Commercially cost effective HF-active film-forming polymer compositions and HF-active films that have long-term flexibility and $T_m$ greater than 90° C. are desirable as alternatives to f-PVC compositions and films. Preferably, the polymer compositions and films are also essentially halogen-free.

Patent Application Publications WO2002/102898 and US2003/0021945 disclose a blend of 20 to 80 percent, by weight, of low weight-average molecular weight copolyester with a carboxyl-containing polyolefin that has a dielectric loss (DLF) factor of 0.05 or more at 27 MHz and 23° C. This composition is reported to be HF-active, but the blend has a low melting point, limiting temperature resistance. Also, blends of EVA and low molecular weight polyester are immiscible and result in poor optical clarity.

U.S. Patent Application Publication 2005/0255328 discloses potassium-neutralized ionomer compositions modified with fatty acids and polyols or polyesters that have RF weldability.

U.S. Pat. No. 7,935,765 describes miscible blends containing an ethylene copolymer comprising ethylene and maleic anhydride, maleic acid monoesters, maleic acid diesters, fumaric acid monoesters, or mixtures thereof and an ethylene copolymer comprising ethylene and vinyl acetate, alkyl acrylates, alkyl methacrylates, carbon monoxide and mixtures of two or more thereof. U.S. Pat. No. 7,879,949 discloses similar blends that are reported to be HF-weldable and have higher temperature resistance compared to high polarity ethylene copolymers due to their higher melting points. However, the polarity of the blends is still not strong enough to attain robust HF welding and certain desirable properties, such as antistatic, etc.

It is desirable to find additional HF-weldable compositions that can remain flexible without the inclusion of a plasticizer and exhibit improved properties over known HF-weldable compositions.

Antistatic property is also important for many applications. Generally, a fabricated article made from a polymeric material can become statically charged, and the surface can attract and hold charged particles such as dust in the air. In some cases an article can become damaged and/or otherwise devalued by the adhesion of electrostatically charged species.

Except for polymers of inherently high polarity, most organic polymeric materials lack adequate antistatic resistance especially at low humidity. This is especially true for polyolefin materials, such as polypropylene, polyethylene, and ethylene copolymers, etc. Many attempts have been made to address this issue from aspects of performance, cost, and ease of conversion to final products. A common approach to enhancing the antistatic properties of thermoplastics is to introduce low-molecular weight antistatic agents into the polymeric material by compounding prior to or during the manufacturing of articles, e.g., by means of molding or film-forming processes. Antistatic agents work by migrating to the external polymer surface of the manufactured articles because of their high volatility and poor compatibility with polymer composition. They form a continuous film on the surface of the polymers. Therefore, the incorporation of a low-molecular weight antistatic agent for achieving antistatic is not trouble free. Materials that come in contact with the composition can become contaminated due to bleeding of the antistatic agent out of the composition and/or the antistatic agent effect can be deteriorated with time.

Another commonly practiced approach is to add permanent, non-diffusing antistatic agents based on polymers with high antistatic properties. For example, block copolymers based on polyether-block-amide (commercially supplied by Atochem under the PEBAX® tradename) may be used as permanent antistatic agent by compounding with an isolative polymer to lower the surface resistivity.

While polyether-block-amides may perform well in certain polymer systems, they do not perform well with polyolefin systems. Due to their poor compatibility with polyolefin materials, a third polymer serving as a compatibilizer may have to be added to insure the antistatic function of the polyolefin matrix. This may confine the composition to be processed in a narrow processing window for attaining the antistatic performance. Polyetheramide block copolymers do not have suitable direct adhesion to other substrates, especially polyolefin substrates. Their high cost is another issue for their use as permanent antistatic agents.

Potassium-neutralized ionomer compositions have been developed to act as permanent antistatic agent in blending with polyolefins (see e.g. PCT Patent Application publication WO2004-050362). K-ionomer compositions may function well as permanent antistatic agents, but they are difficult to produce and handle in initial manufacture and when converting into final products.

Overall, a satisfactory solution for polyolefin-based materials with adequate antistatic performance cannot be achieved without some deficiencies.

BRIEF SUMMARY OF THE INVENTION

This invention relates to a composition comprising, consisting essentially of, or prepared from:

(a) A base resin present in an amount of about 20 to about 90 parts by weight of the combination of (a), (b) and (c), comprising or consisting essentially of
  i. 70 to 100 weight %, based on the combination of i. and ii., of at least one ethylene copolymer, wherein the copolymer comprising copolymerized units of ethylene and copolymerized units of a polar comonomer selected from vinyl acetate, alkyl methacrylate, alkyl acrylate, carbon monoxide or mixtures thereof, wherein said polar comonomer is present in the copolymer in an amount from about 6 to about 40 weight %; and
  ii. 0 to 30 weight %, based on the combination of i. and ii., of polyethylene homopolymers, polyethylene copolymers, polypropylene homopolymers or polyproylene copolymers;

(b) a copolymer comprising copolymerized units of ethylene and copolymerized units of a comonomer providing an amine-reactive site comprising an anhydride group, a vicinal pair of carboxylic groups or a carboxylic group adjacent to an alkoxycarbonyl group, wherein the alkoxy group contains up to 20 carbon atoms, and optionally copolymerized units of a third comonomer, wherein the amine-reactive site is present in the copolymer in an amount of from 3 to 25 weight %, in an amount of from about 10 to about 80 parts by weight of the combination of (a), (b) and (c); and (c) a short chain polymer having from about 5 to 50 repeat units and containing one primary amine active amine site, the remainder of the side chain polymer being substantially unreactive with the amine-reactive sites of the copolymer of (b) and comprising propylene oxide, ethylene oxide, or mixture thereof, in an amount of from about 3 to about 30 parts by weight of the combination of (a), (b) and (c).

In a particular aspect the composition comprises a blend of (a) and (d) an ethylene graft copolymer comprising polyetherimide segments, wherein the ethylene graft copolymer comprises, consists essentially of, or is produced from, a trunk copolymer comprising copolymerized units of ethylene, copolymerized units of a comonomer providing an amine-reactive site comprising an anhydride group, a vicinal pair of carboxylic groups or a carboxylic group adjacent to an alkoxycarbonyl group, wherein the alkoxy group contains up to 20 carbon atoms, and optionally copolymerized units of a third comonomer; and at least one type side chain polymer linked to said reactive sites through imide linkages, said side chain polymer being derived from a short chain polymer having from about 5 to 50 repeat units and containing one primary amine active amine site, the remainder of the side chain polymer being substantially unreactive with the amine-reactive sites of the trunk copolymer and comprising propylene oxide, ethylene oxide, or mixture thereof.

The invention also provides a process for preparing the blend described above, comprising (1) providing a base polymer comprising a copolymer of ethylene and polar comonomers wherein the polar comonomer comprises a vinyl alkanoate, alkyl acrylate or alkyl methacrylate;

(2) providing a trunk copolymer comprising copolymerized units of ethylene, copolymerized units of a comonomer providing an amine-reactive site selected from the group consisting of an anhydride group, a vicinal pair of carboxylic groups and a carboxylic group adjacent to an alkoxycarbonyl group, wherein the alkoxy group contains up to 20 carbon atoms, and optionally copolymerized units of a third comonomer;

(3) providing a short chain polymer having from about 5 to 50 repeat units and containing one primary amine active amine site, the remainder of the short chain polymer being substantially unreactive with the amine-reactive sites of the trunk copolymer and comprising polyethylene oxide;

(4) heating and mixing for about 15 seconds to about 60 minutes the base polymer, the trunk polymer and the short chain polymer, to provide a blend of the base polymer and an ethylene graft copolymer comprising polyetherimide segments.

The invention also provides polymeric films or powders comprising the composition described above.

The invention also provides a multilayer film structure comprising at least one layer comprising the composition described above; and at least one additional layer comprising a substrate selected from the group consisting of thermoplastic film and sheet, cellular foams, woven and nonwoven fabrics, foil, paper and paperboard products, leather and leather-like products, wood veneer and wood products, and wood and cellulosic composites.

The invention further provides articles of manufacture comprising the film and multilayer structures described above.

DETAILED DESCRIPTION OF THE INVENTION

All publications, patent applications, patents, and other references mentioned herein are incorporated by reference in their entirety. Unless otherwise defined, all technical and scientific terms used herein have the same meaning as commonly understood by one of ordinary skill in the art to which this invention belongs. In case of conflict, the present specification, including definitions, will control.

Unless stated otherwise, all percentages, parts, ratios, etc., are by weight. Further, when an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range. When a component is indicated as present in a range starting from 0, such component is an optional component (i.e., it may or may not be present). When present an optional component may be at least 0.1 weight % of the composition or copolymer.

When the term "about" is used in describing a value or an end-point of a range, the disclosure should be understood to include the specific value or end-point referred to.

Use of "a" or "an" are employed to describe elements and components of the invention. This is done merely for convenience and to give a general sense of the invention. This description should be read to include one or at least one and the singular also includes the plural unless it is obvious that it is meant otherwise.

The term "consisting essentially of" in relation to compositions is to indicate that substantially (greater than 95 weight % or greater than 99 weight %) the only polymer(s) present in a component layer is the polymer(s) recited. Thus this term does not exclude the presence of additives, e.g. conventional film additives; i.e. each layer independently may contain conventional film additives such those described below. Moreover, such additives may possibly be added via a masterbatch that may include other polymers as carriers, so that minor amounts (less than 5 or less than 1 weight %) of polymers other than those recited may be present, wherein these minor amounts do not change the basic and novel characteristics of the invention.

"HF-weldable", "HF-sealable" and "RF-weldable" are interchangeable terms and refer to compositions comprising an exposed HF-active component. For example, an HF-weldable film has HF-weldable material on an exposed film surface, that is, a film surface that can be irradiated with an HF-radiation source. The HF-active material can be a separate layer of the film or in the form of lines, strips, dots, or other patterns on the surface of the film. Preferably, the HF-active material is a separate layer.

The term copolymer takes on its ordinary meaning, that is, a polymer obtained by the copolymerization of two or more different monomers. The term "dipolymer" is a copolymer comprising only two different monomers, and "terpolymer" is a copolymer comprising only three different monomers.

The term "trunk copolymer" as employed herein includes the polymerization product of at least one polymerizable monomer that has no amine-active sites, e.g., ethylene, and at least one polymerizable monomer that provides amine-active sites, e.g., maleic anhydride, and optionally additional comonomers such as vinyl acetate, alkyl acrylate, alkyl methacrylate, etc.

The terms "short chain polymer," "side chain polymer" or "side chain oligomer" as employed herein include the polymerization products of a polymerizable monomer which contains one active amine site per chain. The active amine site can be attached to the amine-active sites of the trunk copolymer and is generally on one end of the side chain polymer while the other ends or substituent groups of the side chain polymer are substantially unreactive with the reactive sites of the trunk copolymer. The extent to which there may be more than one reactive site per chain is determined by the degree of crosslinking obtained in a specific case; i.e., the amount of additional reactive sites per chain, over one per chain, must be so small that the graft copolymer is not substantially cross-linked.

As used herein, the term "(meth)acrylic acid" shall be shorthand notation which shall be taken to mean compositions comprising methacrylic acid and/or acrylic acid. Likewise, the term "(meth)acrylate" shall be shorthand notation which shall be taken to mean compositions comprising methacrylate and/or acrylate.

Thermoplastic compositions are polymeric materials that can flow when heated under pressure. Melt index (MI) is the mass rate of flow of a polymer composition through a specified capillary under controlled conditions of temperature and pressure. Melt indices reported herein are determined according to ASTM 1238 at 190° C. using a 2160 g weight, with values of MI reported in grams/10 minutes.

In one aspect, this invention provides a polymer blend composition incorporating highly polar polyether segments for attaining improved properties, such as HF welding, anti-static, and certain surface properties, such as printing. Desirably, the polymer blend composition, while attaining differentiated properties, still retains balanced performance including user-friendly application processability, temperature resistance, easy manufacturing process, and affordable cost.

In another aspect, this invention is to develop a method to produce a polymer blend composition incorporating highly polar polyether segments in a one-step melting extrusion process.

In another aspect, this invention teaches that the incorporation of a ECP containing polar segments to physically blend with other polymers, such as other ethylene copolymers for attaining target performance, such as HF-weldability, printability and anti-static performance.

Polar Ethylene Copolymers

Compositions of this invention comprise a first component (a), which includes at least one copolymer obtained from copolymerization of ethylene with a polar monomer (that is, a polar ethylene copolymer). Preferably, the copolymer of (a) comprises ethylene/vinyl acetate copolymers, ethylene/alkyl (meth)acrylate copolymers and ethylene/(meth)acrylate/carbon monoxide terpolymers and/or mixtures of any of these. Ethylene (meth)acrylate copolymers include ethylene acrylic ester copolymers and ethylene methacrylic ester copolymers.

Combinations of two or more different polar ethylene copolymers may be suitable. For example, combinations of two or more polar ethylene copolymers with different polar comonomers can be suitable, as can be combinations of two or more polar ethylene copolymers having identical monomers but with different amounts of said monomers.

Ethylene/Vinyl Acetate Copolymers

A composition of this invention can comprise at least one ethylene/vinyl acetate copolymer (an EVA copolymer), or blends thereof.

The weight percentage of vinyl acetate monomer incorporated into an EVA copolymer suitable for use herein can vary from about 2 weight percent up to about 45 weight percent or greater, based on the total weight of the copolymer. The amount of vinyl acetate can be varied to obtain a desirable degree of polarity sought for the blended composition.

The ethylene/vinyl acetate copolymer preferably has a vinyl acetate unit content of from about 6 to about 40% by weight, or from a lower limit of about 6, about 12, or about 15 weight % to an upper limit of about 20, or about 30 or about 40 weight %. The ethylene/vinyl acetate copolymer may optionally be modified by methods well known in the art, including modification with an unsaturated carboxylic acid or its derivatives, such as maleic anhydride or maleic acid. The ethylene/vinyl acetate copolymer preferably has a melt index, measured in accordance with ASTM D 1238 at 190° C., of from about 1 to about 800 g/10 minutes or from about 1 to about 400 g/10 minutes, more preferably from about 1 to about 100 g/10 minutes.

Ethylene/vinyl acetate copolymers suitable for use in this invention include those available from E. I. du Pont de Nemours & Co. (DuPont), Wilmington, Del. under the Elvax® tradename.

A mixture of two or more different ethylene/vinyl acetate copolymers can be used in the compositions for this invention in place of a single copolymer as long as the average values for the comonomer content will be within the range indicated above. Particularly useful properties may be obtained when two or more properly selected ethylene/vinyl acetate copolymers are used in blends of this invention.

Ethylene/Alkyl Acrylate Copolymers

As used herein, ethylene/alkyl (meth)acrylate copolymers include copolymers of ethylene and alkyl acrylates or alkyl methacrylates wherein the alkyl moiety contains from one to 20, preferably one to six carbon atoms. Examples of alkyl acrylates include methyl acrylate, ethyl acrylate and butyl acrylate and examples of alkyl methacrylates include methyl methacrylate, ethyl methacrylate and butyl methacrylate. "Ethylene/methyl acrylate" (EMA) means a copolymer of ethylene and methyl acrylate. "Ethylene/ethyl acrylate" (EEA) means a copolymer of ethylene and ethyl acrylate. "Ethylene/butyl acrylate" (EBA) means a copolymer of ethylene and butylacrylate. Of note are ethylene/butyl acrylate copolymers prepared from i-butyl acrylate comonomers (EiBA) and ethylene/butyl acrylate copolymers prepared from n-butyl acrylate comonomers (EnBA).

The relative amount of the alkyl (meth)acrylate comonomer incorporated into ethylene/alkyl (meth)acrylate copolymer can, in principle, vary broadly from a few weight percent up to as high as 40 weight percent of the total copolymer or even higher, such as from about 6 to about 40% by weight, or from a lower limit of about 6, about 12, or about 15 weight % to an upper limit of about 20, or about 30 or about 40 weight %. Similarly, the alkyl group can comprise from 1-carbon to 6-carbon groups, that is to say the alkyl group can vary from a methyl group up to and inclusive of branched and/or unbranched propyl, butyl, pentyl, and hexyl groups. The relative amount and choice of the alkyl group present in the alkyl (meth)acrylate ester comonomer can be used to manipulate the polarity of the composition. Preferably, the alkyl group in the alkyl (meth) acrylate comonomer has from one to four carbon atoms.

The ethylene/alkyl (meth)acrylate copolymer preferably has a melt index, measured in accordance with ASTM D 1238 at 190° C., of from about 1 to about 800 g/10 minutes or from about 1 to about 400 g/10 minutes, more preferably from about 1 to about 100 g/10 minutes. Of note is an ethylene/methyl acrylate copolymer comprising 20 weight % methyl acrylate with an MI of 8 g/10 min.

Ethylene/alkyl (meth)acrylate copolymers can be prepared by processes well known in the polymer art using either autoclave or tubular reactors. The copolymerization can be run as a continuous process in a stirred high-temperature and high-pressure autoclave reactor. For example, ethylene, the alkyl acrylate, and optionally a solvent such as methanol (U.S. Pat. No. 5,028,674) are fed continuously into a stirred autoclave such as the type disclosed in U.S. Pat. No. 2,897,183, together with an initiator.

Preferably, the ethylene copolymer is of the type that is prepared in a high pressure, tubular reactor according to the procedure described in the article "High Flexibility EMA Made from High Pressure Tubular Process" (Annual Technical Conference—Society of Plastics Engineers (2002), 60th (Vol. 2), 1832-1836). The ethylene copolymer is obtained in a tubular reactor at elevated temperature with additional introduction of reactant comonomer along the tube. However, it should be appreciated that similar ethylene/alkyl acrylate copolymeric material can be produced in a series of autoclave reactors wherein comonomer replacement is achieved by multiple zone introduction of reactant comonomer as taught in U.S. Pat. Nos. 3,350,372; 3,756,996; and 5,532,066, and as such these high melting point materials should be considered equivalent for purposes of this invention.

Ethylene/alkyl acrylate copolymers suitable for use in this invention include those available from DuPont under the Elvaloy® AC tradename.

Mixtures of two or more ethylene/alkyl (meth)acrylate copolymers are contemplated as within the scope of this invention.

Compositions used in this invention may further comprise optional polymers including polyolefins such as, for example, homopolymers and copolymers of polyethylene and/or polypropylene. "Polyethylene" includes low density polyethylene, linear low density polyethylene, high density polyethylene or metallocene polyethylene. The optional polymer(s) can be present in amounts up to about 30 weight % of the base resin of (a), so long as they do not detract from the basic and novel characteristics of the composition and do not significantly adversely affect the desirable performance characteristics, such as the HF weldability, adhesive properties or optical clarity of the composition.

Including small amounts of polyolefins such as polyethylene and/or polypropylene may provide balanced properties such as including ethylene or polypropylene may provide lower cost and/or improved adhesion to low polarity materials without significantly reducing optical clarity of the blend. Inclusion of polypropylene may also provide for higher usage temperatures.

The compositions of this invention also comprise a second polar copolymer different from the copolymer of ethylene and polar comonomers of (a). Notably, the second polar copolymer contains a commoner that provides an amine-reactive site selected from the group consisting of an anhydride group, a vicinal pair of carboxylic groups and a carboxylic group adjacent to an alkoxycarbonyl group that is not present in the first polar copolymer. This copolymer is obtained by copolymerization of at least ethylene and at least one comonomer capable of copolymerizing with ethylene such as an anhydride or a functional equivalent thereof, such as a vicinal pair of carboxylic groups or a carboxylic group adjacent to an alkoxycarbonyl group, wherein the alkoxy group contains up to 20 carbon atoms and the comonomer provides an amine-reactive site in the copolymer. The comonomer includes $C_4$-$C_8$ unsaturated anhydrides, $C_4$-$C_8$ unsaturated acids having at least two carboxylic groups, monoesters or diesters of $C_4$-$C_8$ unsaturated acids having at least two carboxylic groups, and mixtures thereof.

Examples of suitable comonomers include unsaturated anhydrides such as maleic anhydride, and itaconic anhydride; 1,4-butenedioic acids (e.g. maleic acid, fumaric acid, itaconic acid and citraconic acid); and $C_1$-$C_{20}$ alkyl monoesters of the 1,4-butenedioc acids, including methyl hydrogen maleate, ethyl hydrogen maleate, propyl hydrogen fumarate, and 2-ethylhexyl hydrogen fumarate. Of these, maleic anhydride, ethyl hydrogen maleate and methyl hydrogen maleate are preferred. Maleic anhydride, ethyl hydrogen maleate (EHM), or a mixture of the two, are most preferred.

Preferred are copolymers of ethylene and monoalkyl maleates (also known as alkyl hydrogen maleates). As used herein, the term "ethylene/monoalkyl maleate copolymers" refers to such copolymers prepared from ethylene and a maleic acid monoester (sometimes referred to as a "halfester, wherein one carboxyl group of the maleic moiety is esterified and the other is an unesterified carboxylic acid).

Terpolymers or tetrapolymers comprise comonomers in addition to the ethylene and amine-reactive comonomer. Preferably, the additional comonomers are less reactive to amines than the amine-reactive site comonomer. The copolymers include E/X/Y terpolymers, wherein E is ethylene; X is a monomer selected from the group consisting of vinyl acetate, and alkyl (meth)acrylates; and Y is a maleic acid monoester, including maleic monoesters of $C_1$ to $C_4$ alcohols, such as for example, methyl, ethyl, n-propyl, isopropyl, and n-butyl alcohols, wherein X is less than 15 weight %, and preferably less than 5 weight % of the terpolymer. Examples of monomers suitable for inclusion as component X are (meth)acrylic acid esters of $C_1$ to $C_4$ alcohols. For example, suitable acrylate esters include methyl acrylate and butyl acrylate and suitable alkyl methacrylate esters include methyl methacrylate and n-butyl methacrylate. Preferably, when the copolymer is a higher order polymer such as a terpolymer, the combined comonomers other than ethylene are present in about 6 to about 30 weight % of the copolymer. For such copolymers, the alcohol moiety used in the maleic acid monoester comonomer may be the same as that used in the alkyl (meth)acrylate comonomer, or it may be different.

Specific examples of the copolymer include ethylene/maleic acid monoester dipolymers such as ethylene/ethyl hydrogen maleate dipolymer, ethylene/maleic acid monoester/methyl acrylate terpolymers, ethylene/maleic acid monoester/methyl methacrylate terpolymers, ethylene/maleic acid monoester/ethyl acrylate terpolymers, ethylene/maleic acid monoester/ethyl methacrylate terpolymers, ethylene/maleic acid monoester/n-butyl acrylate terpolymers and ethylene/maleic acid monoester/n-butyl methacrylate terpolymers.

Of particular note are ethylene/alkyl hydrogen maleate copolymers wherein the alkyl group is ethyl.

The copolymer may comprise about 6 to about 25 weight % copolymerized units of the amine-reactive comonomer, based on the weight of the copolymer. Alternatively, the level of copolymerized units of the amine-reactive comonomer (for example ethyl hydrogen maleate) is from a lower limit of about 6, 8 or about 10 weight % to an upper limit of about 18, about 20, or about 25 weight based on the total weight of the copolymer.

The copolymer may have a melt index from about 5 to about 400 g/10 min., preferably about 5 or about 10 to about 100 g/min. A representative copolymer is a random copolymer having a melt index of about 5 to 100 grams/10 minutes and consisting essentially of copolymerized ethylene and a monoalkyl ester of a 1,4-butenedioic acid in which the alkyl group of the ester has 1 to 4 carbon atoms. Preferably, the trunk copolymer is a dipolymer of ethylene and about 4 to about 25 weight %, or more preferably about 8 to about 20 weight %) of ethyl hydrogen maleate (an "EMAME" copolymer). A specific polymer may comprise from about 8 to about 10 weight % of ethyl hydrogen maleate. Another specific copolymer comprises about 15 weight % of ethyl hydrogen maleate. Such copolymers are commercially available from DuPont under the tradename Fusabond®.

Ethylene/ethyl hydrogen maleate/alkyl ester terpolymers are also known. For example, a terpolymer of 46.4% ethylene, 50% methyl acylate and 3.6% of monoethyl maleate is described in U.S. Pat. No. 3,972,961. Preferably, the amount of MAME in the copolymer is from about 6 to about 20 weight % and the amount of additional comonomer (vinyl acetate, alkyl acrylate or alkyl methacrylate is less than or equal to 15 or less than or equal to 6 weight % of the terpolymer.

Preferably the EMAME copolymer or the EMAME terpolymer has a melting point higher than 80° C.

These copolymers may be synthesized by random copolymerization of ethylene and the particular comonomer(s) in a high-pressure free radical process, generally an autoclave process. For example, ethylene/monoalkyl maleate copolymers can be obtained using a suitable high-pressure process described, for example, in U.S. Pat. No. 4,351,931, the teachings therein incorporated herein by reference. Some examples of this type of ethylene/ester copolymer are described in U.S. Patent Application Publication 2005/0187315.

Short Chain Polymers

The composition also comprises short chain polymers or oligomers having about 5 to 50 repeat units with one reactive end group comprising a primary amine, and the other end and/or substituent groups are substantially unreactive. Polyetheramines suitable for use as the short chain oligomer or polymer contain primary amino groups at the end of a polyether backbone. Examples of short chain polymers include polymers of organic oxides containing 2 to 16 carbon atoms, e.g., ethylene oxide, propylene oxide, 1,2-butylene epoxide, 1,4-butylene epoxide, styrene oxide, 1,2-diphenyl ethylene oxide, dioxolane, and copolymers of said organic oxides containing 2 to 16 carbon atoms, with a primary amine at one end. The average molecular weight (MW) of the polyetheramine is in the range of 300 to 5000, preferably 500 to 3000.

Polyetheramines based on propylene oxide, ethylene oxide, or a mixture of both, are available commercially from Huntsman Chemical under the tradename Jeffamine®. Examples include Jeffamine® M-600 (MW approximately 600, 9/1 PO/EO ratio), Jeffamine® M-1000 (MW approximately 1000, 3/19 PO/EO ratio), Jeffamine M-2005 (MW approximately 2000, 29/6 PO/EO ratio) and Jeffamine M-2070 (MW approximately 2000, 10/31 PO/EO ratio).

The first copolymer, the second copolymer with amine-reactive sites and the short chain copolymer can be combined as a physical blend such as a salt and pepper pellet blend for further thermoplastic processing.

The short chain polymers can be linked to the amine-reactive sites of the copolymer of (b) to provide thermoplastic graft copolymers via the amine end as described in greater detail below.

Thermoplastic graft copolymers described herein are prepared by treating a trunk copolymer having amine-reactive sites with at least one side chain polymer having about one active primary amine site; the other groups or ends of the side chain polymer are substantially unreactive with the reactive sites on the trunk copolymer. In the final graft copolymer the trunk copolymer content ranges in an amount of about 25 to 95 percent by weight and the side chain polymer content ranges from about 5 to 75 percent by weight. The trunk copolymers contain, on a number average, about 300 to 50,000, preferably 500 to 20,000, chain atoms, and a number of amine reactive sites occurring, on the average, at a frequency of about one to 200 per 1000 chain atoms of the trunk copolymer. On the average there will be at least one active site per trunk copolymer chain. The side chain polymer will, in general, be shorter than the trunk copolymer, ranging in length from about 25 to 1,000 chain atoms, preferably about 30 to 300 chain atoms.

The trunk copolymers must be sufficiently stable to withstand heating during subsequent grafting of the side chain polymer. They should also be free from hydroxyl, primary amino, and secondary amino groups that can react with the amine-reactive sites to form thermostable crosslinks, which would cause a loss of the desired thermoplasticity.

The thermoplastic graft copolymer consists essentially of a trunk copolymer and a side chain polymer or oligomer wherein the trunk copolymer and the side chain polymer are preferably linked through imide linkages. The vicinal carboxylic acid groups allow formation of an imide when treated with the primary amine of the side chain polymer. When the trunk polymer is a terpolymer with an additional comonomer such as an alkyl acrylate or methacrylate, the primary amine of the side chain polymer may, depending on reaction conditions, alternatively/additionally react with the ester to provide an amide linkage.

The graft copolymers can be prepared in various ways. Convenient ways include (1) the anhydride route, for use with ethylene/maleic anhydride and other anhydride-containing trunk copolymers, and (2) the vicinal acid-acid or acid-ester route, for use with trunk copolymers having diacid or monoester of vicinal dicarboxylic acid substituents, respectively.

The anhydride route involves simply heating together with mixing the trunk copolymer having carboxylic anhydride groups, preferably maleic anhydride, and the amino-containing side chain polymer in the molten state, at a temperature from 75 to 250° C., such as about 225° C., or in solution at a temperature of 75 to 100° C. or higher. The heating temperature is above the melting point of the trunk copolymer and the amino polymer. The time of reaction, which is dependent upon the temperature and rate of mixing, can vary from about 15 seconds to 60 minutes in the melt, preferably 1 to 10 minutes. Reaction in the melt, an especially preferred procedure, can conveniently be carried out on a roll mill, in a melt extruder, or in internal mixers having convoluted rollers, sigma blades, etc., using a temperature that will give short reaction time and as many passes as necessary to insure complete reaction. Completeness of reaction can be judged by the appearance of the product, good clarity in the melt indicating essentially complete reaction. With a roll mill as the reactor, the trunk copolymer and side-chain polymer can be premixed or mixed during reaction on the mill; and because of the exposure it may be desirable to include stabilizing agents such as inhibitors or antioxidants, or to carry out the operation in a protective atmosphere such as nitrogen. With an extruder as the reactor, premixing as a dry blend is desirable.

The vicinal acid-ester route can also be carried out in the melt for reaction times similar to, but generally slower than, those for the anhydride route described above. The vicinal acid-ester route may be conducted in the same way as that described above for the anhydride route, carried out on a roll mill or in an extruder. Reaction between the polyetheramine and an EMAME copolymer proceeds well to high conversion, if the polar polyetheramine is effectively mixed with the non-polar EMAME for reaction.

The graft copolymer is believed to be obtained by attachment of the amine side chain to the backbone copolymer through imide linkages (with elimination of alcohol) which may be derived through intermediate formation of amic acids, or by prior conversion of the vicinal acid-ester by loss of alcohol to an anhydride and reaction of the latter with the amino oligomer as described above. The graft copolymer product can be characterized by several techniques, which show the presence of imide-linked side chains, the degree of polymerization of the side chains, and the chemical identity of the side chains, to name a few. Certain physical characteristics often are also helpful to show that a graft copolymer has been obtained.

Additional details of the reactions linking the trunk copolymer and the side chain polymer and means of characterizing the graft copolymer may be found in U.S. Pat. No. 3,972,961 and RE 30,754.

The process allows for control of the type and length of the polymer side chain grafted onto the trunk copolymer. From the specific type of trunk copolymer the average frequency of possible reactive graft sites can be readily determined by the fraction, e.g., on a molar basis, of monomer molecules providing the reactive sites which are polymerized into the trunk copolymer. Since the polymeric side chains are preformed prior to reacting with reactive sites on the trunk copolymer excellent control of the graft copolymer is achieved. The resultant thermoplastic graft copolymer is relatively uncontaminated with ungrafted side chain polymer, which may be a major problem in conventional free radical graft polymerization.

Incorporation of up to 20 weight % of Jeffamine® M-600 or 35 weight % of Jeffamine® M-1000 into an EMAME copolymer may be possible. The amount of possible polyetheramine incorporation increases for an EMAME copolymer with higher MAME content. An average of at least about three polyether segments grafted onto each EMAME polymer backbone is preferable.

Notably, the ethylene graft copolymer has a ratio of the mole % of polyetheramine added divided by the mole % of the comonomer providing an amine-reactive site in the starting trunk copolymer of about 0.1 to about 0.9, or from about 0.2 to about 0.8, or from about 0.3 to about 0.7.

The graft copolymer based on the reaction of EMAME and polyetheramine may have the ratio of the weight of polyetheramine added divided by the molecular weight of the polyetheramine versus the weight % of MAME in the starting EMAME copolymer divided by 144 of about 0.1 to about 0.9. For example, for 100 grams of EMAME (10 weight % of MAME), polyetheramine with a MW of 1000 would be incorporated into the polymer in the range of 6.9 grams to 62.5 grams. A preferred range is 0.2 to 0.8.

The advantage of this process in providing control of the side chain polymers is illustrated as follows. To provide improved properties at elevated temperatures, it may be desirable to have the side chain polymers of sufficient length so that these side chains can crystallize. For another use, it may be important that the side chain is not long enough to provide a substantial amount of crystallization at room temperature. With polyethylene oxide side chains, good antistatic behavior may be obtained when the chains are mobile, i.e., non-crystalline. When the side chains contain more than about 80 chain atoms, the side chains may crystallize at room temperature and lose their good antistatic behavior.

The graft copolymer can be prepared and then blended with the base resin by standard blending procedures. Blending in the melt can conveniently be carried out on a roll mill, in a melt extruder, or in internal mixers having convoluted rollers, sigma blades, etc. Preferably, the grafting of the side chain polymer to the trunk polymer and the blending with the base resin can be conducted in a single operation, provided the base resin does not react with the side chain polymer. The method comprises (1) providing a base resin as described above; (2) providing a trunk copolymer as described above; (3) providing a short chain polymer as described above; and (4) heating and mixing for about 15 seconds to 60 minutes the base polymer, the trunk polymer and the short chain polymer, to provide a blend of the base polymer and an ethylene graft copolymer comprising polyetherimide segments.

The blending and grafting may be conducted using a roll mill, in a melt extruder, or in internal mixers having convoluted rollers, sigma blades, etc, preferably using an extruder. For example, pellets of the base resin, trunk polymer and side chain polymer may be pre-blended to provide a salt-and-pepper blend of the three components and then melt blended in an extruder. During the extrusion, the trunk polymer and the side chain polymer can react to form the graft copolymer. Alternatively, the components may be fed from separate hoppers into the extruder to be blended and grafted.

The compositions used in this invention can additionally comprise optional materials commonly used and well known in the polymer art. Such materials include plasticizers, stabilizers including viscosity stabilizers and hydrolytic stabilizers, primary and secondary antioxidants, ultraviolet ray absorbers, anti-static agents, dyes, pigments or other coloring agents, inorganic fillers, fire-retardants, lubricants, reinforcing agents such as glass fiber and flakes, foaming or blowing agents, processing aids, slip additives, antiblock agents such as silica or talc, release agents, tackifying resins and/or mixtures thereof. Some suitable additives are described in the Kirk Othmer *Encyclopedia of Chemical Technology*, for example.

If present, the optional additives described above may be present in the compositions of this invention in quantities of from about 0.01 to 25 weight %, or from 0.01 to 15 weight %, or from 0.01 to 10 weight %, or from 0.01 to 5 weight %, so long as they do not detract from the basic and novel characteristics of the composition and do not have a significant adverse effect the performance properties, such as the adhesive properties, of the composition in the amounts used. For the avoidance of doubt, the weight percentages provided for the compositions described herein for the combination of (a), (b) and (c) or (a) and (d) do not include the presence of optional components, unless otherwise stipulated.

Of note are compositions that do not comprise or include low weight-average molecular weight copolyester such as described in WO2002/102898 and US2003/0021945. The compositions described herein exhibit HF-weldability without inclusion of such copolyesters. Inclusion of such copolyesters may unacceptably reduce the clarity of articles prepared from the composition.

Polymer compositions used in this invention are HF-active in the absence of HF-active fillers. Nonetheless, the polymer composition optionally may contain at least one HF-active filler as an additive to enhance HF-activity or to modify some other property of the composition. Examples of HF-active fillers include aluminum trihydrate, magnesium hydroxide, and sodium aluminosilicate.

The components used in the compositions can be dry blended and subsequently melt blended in a twin-screw extruder and repelletized as is known in the art. For example, the blends can be prepared by melt mixing the components in a 30-mm twin-screw extruder, using a melt temperature of from 180° C. to 230° C.

Melt-blended resins of this invention can be converted by a variety of techniques and processes known to one of ordinary skill in the art. For example, the composition can be converted into a film or sheet by cast or blown film die extrusion techniques. As an alternative, the composition can be coextruded with other thermoplastic polymers, such as PE or PP, to provide a multilayer structure. As a further alternative, a coextruded film can be created incorporating polar barrier resins such as polyamides, ethylene vinyl alcohol copolymer (EVOH) or polyester.

In other applications a composition as described herein can be directly coated onto a substrate by processes well known in the art, including, for example, extrusion lamination, extrusion coating, coextrusion lamination and coextrusion coating. These techniques involve laying down a molten curtain of the polymer onto the substrate, or between substrates moving at high speeds as they come into contact with a cold roll.

Alternatively, a composition as described herein can be prepared as a powder with granular sizes of up to 600, alternatively up to 400, alternatively up to 200, microns in size. A powder composition of this invention can comprise granules that vary in size from about 100 to about 600 microns. The average particle size in a powder composition of this invention can be from about 150 to about 200 microns. The compositions can be milled, pulverized or otherwise processed by methods known in the art to provide a desired particle size suitable for application to a substrate.

The powder can be applied to a substrate by a technique such as powder scattering, wherein the powder is evenly distributed across a working width of a substrate and thereafter melted, smoothed, and cooled to provide a uniform coating of the composition on the substrate. Such a process can be suitable for use in the automobile industry for carpet backing, to prepare conveyor belts, interlinings, medical textiles, and in other clothing applications.

The powder can be used in powder dot processes wherein the powder can be placed in cavities of a heated engraved roller and transferred to a preheated substrate in a pattern, sintered in an infra-red channel, and calendared in a smoothing unit. Powder dot processes can be used to prepare interlinings for lightweight outerwear, and fixing materials for shirt collars, shoe insoles, outerwear and other clothing applications.

A powder composition of this invention can be used in paste dot applications for light and temperature sensitive substrates. A dispersion of the powder can be applied in a pattern of dots to a substrate by a rotating printing screen. The paste dots can be dried using a hot air nozzle dryer.

Substrates of interest include thermoplastic film and sheet, cellular foams (such as polyurethane, polystyrene, and polyolefin foams), woven and non-woven fabrics, foil, paper and paperboard products, leather and leather-like products, wood veneer and wood products, and wood and cellulosic composites.

The compositions may also be processed by various molding techniques such as injection molding, compression molding, injection blow molding and the like.

Tubular profiles of the HF-active compositions are also within the scope of this invention. Tubular profiles are useful for forming HF-active tubing suitable for thermally welding or HF welding to HF active films to form, for example, medical collection bags, infusion bags, and other liquid containment or inflatable devices that require tubing attachments.

The compositions described herein are particularly well suited for preparing HF-active films, multilayer structures, or articles. HF-active films and articles are weldable to themselves or other substrates using a HF process that incorporates a HF welder, preferably a radio-frequency (RF) welder. HF welders include RF welders and microwave welders. Commercially available HF welders include those available from Callanan Company (Alloyd RF Sealing Systems), Weldan, Colpitt, Kiefel Technologies, Thermatron, and Radyne. RF welders typically operate at a frequency of 27.12 MHz, 13.56 MHz, or 40.68 MHz. Microwave welders may also be suitable for welding or sealing films of this invention and typically operate at a frequency of 2.45 gigahertz (GHz), 5.87 GHz, or 24.12 GHz. HF welding of films of this invention generally involves operating a HF sealing apparatus with a die or tooling temperature set at 23° C. or higher. Increasing the die or tooling temperature can improve HF activation of the HF-active polymer composition, thereby reducing seal time. Die or tooling temperatures can be 40° C. or higher, even 60° C. or higher, but are generally lower than 120° C. for HF welding films of this invention. Die or tooling temperatures higher than the weight-average $T_m$ of a film usually heat-seal or melt-weld the film to a substrate and are generally higher than is necessary for HF welding.

HF-active films of this invention can be of any gauge. Typically, the gauge is from 1 to 100 mils (25 to 2500 micrometers (μm), preferably from 5 to 50 mils (125 to 1000 μm). The HF-active films preferably exhibit tensile strengths in the machine direction (MD) and transverse direction (TD) of greater than 2,000 psi (14 MPa), ultimate elongations of greater than 400%, and 2% secant modulus values of 4,000 psi (28 MPa) to 30,000 psi (207 MPa) when tested according to ASTM method D-882. More preferably, the HF-active films further exhibit MD and TD Elmendorf tear strengths of greater than 200 grams/mil (8 grams/μm) when tested according to ASTM method D-1922. Films having these aforementioned properties are sufficiently durable for subsequent conversion operations such as thermal lamination and HF-welding and for end use applications such as medical bags, textile laminates, and automotive interior laminates.

Films of this invention are also capable of thermal lamination, sealing, and welding using thermal processes such as hot roll lamination, flame lamination, and heat sealing. A combination of a thermal process with a HF process is also feasible. For example, thermally laminating a film of this invention to a substrate such as a fabric can form a film/fabric composite. HF-welding two such film/fabric composites together at a film/film interface (or folding the same film/fabric composite back on itself to form a film/film interface) can provide a fabric/film/fabric multilayer structure.

One embodiment of this invention is a HF-weldable multilayer film comprising an exposed HF-active polymer layer and a HF-inactive layer. Of note are multilayer films of this invention that have "AB", or "ABA" structures, wherein "A" corresponds to a HF-active layer and "B" corresponds to a HF-inactive or weakly HF-active layer. "ABC"-type structures are also suitable, wherein "C" is an HF-inactive or weakly active layer different from "B". Any number of different or repeated layers are conceivable within the scope of this invention, provided at least one layer, preferably at least one exposed layer, is HF-active.

HF-active films of this invention can comprise at least one adhesive layer. Adhesive layers may be, for example polar-functional ethylene copolymers such as EVA, EEMA, EVA-grated MAH, EAA, or low molecular weight thermoplastic adhesives such as copolyester, copolyamide or polyurethane. Additionally, HF-active films may contain liquid applied emulsions or dispersions. The emulsions or dispersions may be aqueous or solvent borne, thermoplastic or thermosetting. Adhesive layers are useful for bonding materials to HF-active films while desirably preserving an exposed HF-active layer.

HF-active films and articles of this invention have many uses. For example, layering two sheets of HF-active film, or folding the same HF-active film onto itself and HF-sealing around a perimeter of the sheet(s) forms a bag or a pouch. Such bags can be suitable for medical applications such as fluid delivery bags or liquid waste collection bags, liquid containment, gel packages such as for hot packs and colds packs, and beverage containment pouches.

One particularly useful application is for manufacturing designs capable of being laminated onto clothing. Films of this invention exhibit a desirable temperature resistance, water and detergent resistance, flexibility, elasticity, and adhesion to fabrics and textiles, making them well suited for clothing applications such as adhesive interlinings, stitched seam taping or water-resistant coatings. Similarly, the HF-active compositions can be used to prepare decorative films or appliqués for, for example, athletic shoe applications.

HF-active films of this invention may be flocked films having short fibers adhered to a surface of the HF-active film. For example, HF-active flocked films generally contain a liquid adhesive disposed on a surface of an HF-active film with flocking fiber disposed on a surface of the adhesive remote from the HF-active film. Drying or curing the adhesive bonds the flocking fiber to the HF-active film. Suitable flocking fibers include polyester, nylon, rayon, or other natural or synthetic fibers that are generally about 0.5 mm or greater in length. Suitable liquid adhesives include aqueous and solvent-borne thermoplastic or thermosetting adhesives. Such adhesives often are based on acrylic, urethane, epoxy, or polyvinyl acetate chemistry. Desirably, flocked films contain flocking on one surface and an HF-active layer on an opposing surface. HF-welding can adhere such a flocked film to a woven or non-woven substrate, such as a garment. One particularly useful application for HF-active flocked films is in preparing athletic apparel or decorative clothing with flocked film designs HF welded thereon. Flocked HF-active films generally have a felt-like or velour-like feel on the flocked surface.

HF-active films of this invention having a weight-average $T_m$ of greater than 100° C. are particularly well suited for high temperature applications including automotive interior lamination, especially to woven or nonwoven textiles. An automotive sun visor, for example, can comprise an HF-active film thermally laminated to a fabric to form a film/fabric composition, with the film/fabric composition HF welded around a rigid core. Additionally, film/fabric laminates containing films of this invention are useful in fabricating into headliner structures, door panels, seating covers, and carpet mats.

Although HF-welding techniques are described above for films comprising the composition described herein, similar HF-welding techniques can be used to adhere other types of articles such as those prepared from the composition using, for example, powder scattering, powder dot and paste dot processes.

While the invention has been particularly shown and described with reference to the preferred embodiments thereof, it will be understood by those skilled in the art that various changes in form and details may be made without departing from the spirit and scope of the invention.

EXAMPLES

Without further elaboration, it is believed that one skilled in the art using the preceding description can utilize this invention to its fullest extent. The following Examples are, therefore, to be construed as merely illustrative, and not limiting of the disclosure in any way whatsoever. The methods for the evaluation of the raw materials used and the performances of the resulting laminates in the following Examples and Comparative Examples are shown below.

Materials Used

PEA-1: a monoamine-terminated polyether with a MW of 1000 and mole ratio between PO and EO of 3/19 obtained from Huntsman as Jeffamine® M-1000.

CPE-1: a low molecular weight copolyester available from EMS-Chemie under the tradename Griltex® D1519E.

EMAME-1: a copolymer of ethylene, 90.5 weight %, and MAME, 9.5 weight %, with MI of 30 as measured at 190° C.

EMAME-2: a copolymer of ethylene, 85 weight %, and MAME, 15 weight %, with MI of 30 as measured at 190° C.

EVA-1: a copolymer of ethylene and 25 weight % of vinyl acetate, with MI of 2 as measured at 190° C.

EMA-1: a copolymer of ethylene and 20 weight % of methyl acrylate, with MI of 8 as measured at 190° C.

AOX-1: an antioxidant commercially available from CIBA-Geigy under the tradename Irganox® 1098.

PP-1: polypropylene available from Dow Chemical Company under the designation DX5E98 (10 mil, 170° C. press molded film).

PE-1: linear low density polyethylene with MI of 4.8 g/10 min, (190° C., 2.16 kg) available from Nova Chemicals under the designation Sclair® 8107.

PE-2: low density polyethylene formerly commercially available from DuPont Performance Elastomers under the designation DPE1640.

All parts and percentages are given by weight unless otherwise indicated.

Testing Methods

Melt Index (MI) was measured according to ASTM D1238 at 190° C. using 2.16 kg of mass, unless indicated otherwise.

Thermal characteristics were measured using differential scanning calorimetry (DSC). A TA Instruments Q1000 MDSC (Modulated DSC) operating in "Standard Mode" was used to determine the melting temperature and the heat of fusion of the samples listed in Table 2. Reported in Table 2 is only the portion of the heat of fusion the above 90° C.

Cast films (Table 2) were used to measure the following. Tensile strength, elongation at break and tensile strength at 100% elongation were measured according to ASTM D882. Haze was measured on cast films according to ASTM D1003.

The surface resistivity and volume resistivity tests were conducted in compliance with the ASTM D-257 method. Surface Resistivity (ohm/sq) was measured according to ASTM D-257 using the alternating polarity technique. The voltage was set at 500 volts. A Keithley Electrometer 6517A and a resistivity test fixture 8009 were used for all of the measurements. The tests were conducted at 500 volts. The temperature and the humidity were controlled at 23° C. and 20% RH (or specified RH %) in an environmental chamber. Each sample was allowed to equilibrate at least for 48 hours prior to the measurements.

The Radio Frequency (RF) welding study was conducted by using a Solidyne Industrial RF Generator that has a maximum output of 10 kW and operates at 27 MHz. Two separate cast film sheets were placed between two electrodes. The electrodes were pressed together with compressed air at 60 psi on a two-inch diameter ram. The electric field strength was adjusted from 4.0 kV to 5.0 kV by increasing or decreasing the voltage across the electrodes. The dwell time was varied from 0.5 to 4.0 seconds. For example, RF energy was applied to the film samples at 4.9 kV for 2 seconds of weld time and then the welded sample was held together under pressure for 2 seconds, allowing the melted polymer to set. The assessment of RF welding is based on the ease of RF welding to produce good quality welded laminates with high seal strength. The quality of the weld is assessed by examining any noticeable seal mark at the edge of the electrodes. Excellent welds will not have any seal marks. The two layers of the RF sealed films were peeled apart by hand to assess seal strength and rated as follows:

Excellent: the two films cannot be separated without rupture of the seal.

Good: the two films can be separated with effort.

Poor: the two films can be separated with ease.

No: the two films did not seal under the RF treatment.

The compositions used in the Examples and Comparative Examples in Tables 1, 2, and 3 were prepared by melt blending using a 30 mm diameter twin screw extruder with a mixing screw, using a melt temperature of from 180° C. to 230° C. All blend samples were made on a 26-mm twin-screw extruder, typically with 180-200° C. barrel temperature settings and screw speed of 100 rpm. For example, Example 1 (Table 2) Polymers, EMAME-1 and EMA-1, with AOX-1 were fed at the back end of the extruder, followed by an intense kneading section in the extruder screw to disperse these ingredients. When included, the PEA-1 in liquid form was injected into the extruder barrel through a Katron pump with temperature setting at 50° C. after the initial mixing section, and this liquid injection was followed by additional intense mixing elements. The melt strand from the extruder was water quenched and cut into pellets for collection and subsequent evaluation.

Cast films were prepared using a slot die cast film line with a 28-mm diameter, 28:1 length to diameter ratio (L/D) twin screw extruder operating with ramped extruder zone temperatures of 160° C. to 180° C., and a 10-inch wide slot die operating at temperature of 180° C. to cast a melt-processable polymer onto a chilled 20° C. casting roll, forming monolayer films of varied thickness.

In the Tables below, "E+n" stands for "×10ⁿ". CNP stands for "could not peel". NA stands for "not available".

Table 1 shows the thermal properties, as measured by DSC, of ethylene vinyl acetate copolymers with varied amounts of vinyl acetate. As the vinyl acetate content increases, both the melting temperature and the crystalline content drop accordingly. EVA-1 even at 25 weight % of VA still requires a modifier to improve HF welding, such as a low molecular weight copolyester. Comparative Example C1 is a blend of EVA-1 (25 weight % VA) with 20 weight % of low molecular weight copolyester according to US2003/0021945. The melting point of the blend is not significantly higher than the unmodified EVA. A 10-mil film prepared from this blend feels slightly tacky to the touch and has very high haze (opaque in fact), making it unsatisfactory for some applications. Comparative Example C2 is a blend of EVA-1 (25 weight % VA) with 20 weight % of EMAME-1 according to U.S. Pat. No. 7,879,949. EVA and E/MAME are very compatible. The melting temperature of the blend is significantly improved over the unmodified EVA. A 9-mil film prepared from this blend does not feel tacky to the touch and has low haze. However, the polarity is not good enough for some applications.

TABLE 1

| Comparative Example | VA (weight %) | Additive (20 weight %) | Melting Point (° C.) | Heat of Fusion | Haze |
|---|---|---|---|---|---|
| EVA-1 | 9 | | 100 | 82 | |
| | 12 | | 96 | 78 | |
| | 18 | | 88 | 65 | |
| | 25 | | 78 | 53 | |
| | 28 | | 75 | 44 | |
| | 32 | | 63 | 44 | |
| | 40 | | 47 | 23 | |
| C1 | 25 | CPE-1 | 79 | NA | 100 |
| C2 | 25 | EMAME-1 | 104 | NA | 8.2 |

The data provided in Table 2 demonstrate the unexpected properties of films of this invention. All samples were prepared using one-step melt processing in which blending and grafting occur in a single melt operation. The highlighted properties include upper usage temperature (temperature resistance) as indicated by the melting point and heat of fusion $H_f$, HF welding capability and antistatic performance, which are most relevant to critical requirements of potential applications of these blends.

Table 2 summarizes blends prepared by melt blending the components listed as parts by weight. Comparative Examples C3 and C4 are blends of EMA-1 and EMAME copolymers that do not contain PEA components. Examples 1 to 7 are blends of EMA-1 and EMAME copolymers containing varied amounts of PEA-1.

Table 2 also lists the dielectric and antistatic properties of the samples. The dielectric properties were measured to assess the polarity (inherent polarity, such as melting point) of the Examples.

TABLE 2

| | Parts by weight | | | | | | | | |
|---|---|---|---|---|---|---|---|---|---|
| | C3 | C4 | 1 | 2 | 3 | 4 | 5 | 6 | 7 |
| EMAME-1 | 20 | | 30 | 30 | | | | | |
| EMAME-2 | | 30 | | | 30 | 30 | 30 | 40 | 40 |
| EMA-1 | 80 | 70 | 70 | 70 | 70 | 70 | 70 | 60 | 60 |
| PEA-1 | 0 | 0 | 6 | 8 | 9 | 12 | 15 | 12 | 16 |
| Melt Flow Index | 11.5 | NA | 7.9 | 7.2 | 8.3 | 7.3 | 6.8 | 8.6 | 8.8 |
| Digital Scanning Calorimetry | | | | | | | | | |
| Melting point (° C.) | 105.00 | NA | 105.00 | 105.00 | 100.10 | 98.50 | 97.50 | 102.00 | 102.00 |
| $H_f$ (j/g), above 90° C. | 29.50 | NA | 34.40 | 33.20 | 26.40 | 25.80 | 24.60 | 29.80 | 29.40 |
| Cast Film thickness (mils) | 9.7 | 9.75 | 9.9 | 9.5 | 10.1 | 8.9 | 9.9 | 9.15 | 9.75 |
| Tensile Properties at 23° C. Machine Direction | | | | | | | | | |
| Secant Modulus at 1% strain (psi) | 5726 | 10086 | 5745 | 5337 | 4645 | 4311 | 4005 | 4875 | 4445 |
| Tensile at Break (psi) | 1671 | 2457 | 1369 | 1278 | 1259 | 1362 | 1282 | 1342 | 1278 |
| Break % Elongation | 913 | 808 | 835 | 848 | 800 | 874 | 854 | 837 | 852 |
| Transverse Direction | | | | | | | | | |
| Secant Modulus at 1% strain (psi) | 5505 | 9962 | 5575 | 5310 | 4631 | 4262 | 4006 | 4928 | 4397 |
| Tensile at Break (psi) | 1509 | 2288 | 1449 | 1222 | 1290 | 1218 | 1221 | 1244 | 1146 |
| Break % Elongation | 876 | 748 | 904 | 878 | 860 | 851 | 876 | 821 | 794 |
| RF welding seal strength | good | good | good | good | excellent | excellent | excellent | excellent | excellent |
| quality | poor | poor | good | good | excellent | excellent | excellent | excellent | excellent |
| Haze | 2.66 | 3.79 | 25.80 | 26.63 | 21.93 | 23.20 | 31.17 | 19.07 | 27.33 |
| Dielectric | 2.37 | 2.40 | 2.68 | 2.71 | 2.86 | 2.95 | 2.98 | 2.85 | 2.95 |
| Dielectric Loss Factor | 0.036 | 0.035 | 0.078 | 0.092 | 0.105 | 0.12 | 0.147 | 0.107 | 0.144 |

TABLE 2-continued

| | Parts by weight | | | | | | | | |
|---|---|---|---|---|---|---|---|---|---|
| | C3 | C4 | 1 | 2 | 3 | 4 | 5 | 6 | 7 |
| Tan Delta | 0.0149 | 0.0147 | 0.0291 | 0.0338 | 0.0369 | 0.0407 | 0.0493 | 0.0377 | 0.0487 |
| Surface resistivity (Ohm/sq) | 1.66E+16 | NA | 9.2E+12 | 9.4E+11 | 1.4E+12 | 3.4E+11 | 1.1E+11 | 7.3E+11 | 1.2E+11 |
| Volume resistivity (Ohm-cm) | 1.1E+16 | NA | 2.3E+12 | 3.9E+11 | 7.7E+11 | 2.9E+11 | 1.2E+11 | 2.9E+11 | 6E+10 |

As measured using DSC, the blends containing PEA-1 retained a high melting point around 100° C. The heat of fusion correlates to the amount of crystalline phase of the sample, and the amount of the heat of fusion above 90° C. show that there are sufficient amounts of high melting crystallinity remaining in the Examples. Thus, despite the fact that the Example samples are highly polar, they all have very good thermal resistance properties compared to other ethylene copolymers, such as EVA of high VA content.

All Examples showed comparable mechanical properties compared to Comparative Examples C3 and C4.

Comparative Examples C3 and C4 could be HF welded, but the sealing was rather poor. It required a higher voltage and longer duration to get welding to a seal strength point that the film was distorted when the films were pulled apart. Examples 1 and 2 showed much improved HF welding, while Examples 4 to 7 had excellent HF welding performance.

The data in Table 2 demonstrate that the blends of ethylene copolymers and EMAME that contain PEA components attain excellent HF welding capability, while still retaining excellent temperature resistance and mechanical properties. The combination of these properties is not attainable for conventional ethylene copolymers, such as EVA or E/alkyl acrylate copolymers, even when blended with EMAME.

The dielectric data demonstrate that the materials of this invention exhibit high polarity not found in prior ethylene copolymer blends. As shown in Table 2, the dielectric loss factor (DLF) increased as the PEA content increased in the blends. This demonstrates that the ethylene based materials of this invention exhibit high polarity.

In the dielectric data, the most important part for correlating to HF welding is the dielectric loss factor (DLF). The DLF number correlates to how much HF absorption the material has. A material of lower DLF requires higher HF energy to undergo HF welding. The higher the DLF is, the more the material is heated with RF welding. For example, Example 5 with loss factor of 0.147 is heated very fast with HF, while Comparative Example C4 with a DLF of 0.035 does not heat as well with HF. In referring to Table 2, the dielectric data correlate with the results of the HF welding testing.

Examples 1 to 7 with PEA components showed much reduced surface resistivity as compared to Comparative Example C3 of comparable composition without PEA. Materials are generally considered antistatic with surface resistivity in the range of 12 or less (log scale). Interestingly as shown by Example 1, even with only 6 weight % of PEA-1, both surface resistivity and volume resistivity drop to the range of surface resistivity to be considered antistatic.

Adhesion to Other Polymers

The adhesion strength between the Examples listed in Table 3 and other polymers, namely, PE-1, PE-2, and PP, was measured as follows. Press molded films of 10 mil of PE and PP were prepared. Then the sandwich samples of the press molded film and the cast film of the Examples were pressed molded at condition indicated in Table 3. For example, a sandwich laminate of PE-1 (molded film)/Example 8 (cast film)/PE-1 was laminates at 150° C. for 60 sec. The laminates with PE-1 and PE-2, the sandwich laminates were prepared at 150° C. for 60 sec. For laminates with PP, the sandwich laminates were prepared at 190° C. for 30 sec. The peel strength strips of the laminates were tested for adhesion reported in (lbf/in) in an INSTRON (90 degree peel test; at a speed of 50 mm/minute).

The data in Table 3 demonstrate that Examples 8 through 12, despite high polarity, still provide excellent adhesion to other, nonpolar substrates. This is important for end use applications, where in most cases are in multilayer structure form. It is important that the material of high polarity can be adhered to polymers of other layers either by coextrusion, lamination or extrusion coating. This invention provides blends that are able to adhere to polyolefin substrates despite their high polarity. Even with high polarity components, the blends still retain the chemical and physical nature of the polyethylene portions of the polymers.

TABLE 3

| | Example | | | | |
|---|---|---|---|---|---|
| | 8 | 9 | 10 | 11 | 12 |
| | Parts by weight | | | | |
| EMAME-1 | 20 | | | | |
| EMAME-2 | | 30 | 40 | 60 | 20 |
| EMA-1 | 80 | 70 | 60 | 40 | 80 |
| LDPE | | | | | |
| PEA-1 | 4 | 8 | 12 | 18 | 6 |
| Melt Index (g/10 min) | 5.7 | 4.9 | 4.9 | 5.1 | 3.0 |
| Cast film (mm) | 0.32 | 0.32 | 0.39 | 0.33 | 0.40 |
| | Antistatic Properties | | | | |
| Surface resistivity (Ohm/sq) | 5.70E+13 | 2.60E+12 | 9.80E+11 | 3.10E+11 | 1.40E+13 |
| Volume resistivity (Ohm-cm) | 9.20E+12 | 1.30E+12 | 9.30E+11 | 1.00E+10 | 1.30E+13 |
| | Adhesion to other polymers (lbf/in) | | | | |
| PE-1 | 6.24 | 5.99 | CNP | CNP | CNP |
| PE-2 | 5.83 | 6.44 | 7.01 | CNP | CNP |
| PP-1 | 3.06 | NA | 3.63 | 4.15 | NA |

What is claimed is:

1. A composition comprising:
   (a) at least one ethylene copolymer present in an amount of about 20 to about 90 parts by weight, wherein the ethylene copolymer comprises copolymerized units of ethylene and copolymerized units of a polar comonomer selected from vinyl alkanoate, alkyl methacrylate, alkyl acrylate, carbon monoxide or mixtures thereof, wherein said polar comonomer is present in the ethylene copolymer in an amount from about 6 to about 40 weight %;

(b) a copolymer present in an amount of from about 10 to about 80 parts by weight, said copolymer comprising copolymerized units of ethylene and copolymerized units of a comonomer providing an amine-reactive site comprising an anhydride group, a vicinal pair of carboxylic groups or a carboxylic group adjacent to an alkoxycarbonyl group, wherein the alkoxy group contains up to 20 carbon atoms, and optionally copolymerized units of a third comonomer, wherein the amine-reactive site is present in the copolymer in an amount of from 6 to 25 weight %; and (c) a short chain polymer present in an amount of from about 3 to about 30 parts by weight, said short chain polymer having from about 5 to 50 repeat units and containing one primary amine active amine site, the remainder of the short chain polymer being substantially unreactive with the amine-reactive sites of the copolymer (b) and said short chain polymer further comprising copolymerized propylene oxide, copolymerized ethylene oxide, or a mixture of copolymerized propylene oxide and copolymerized ethylene oxide.

2. The composition of claim 1 wherein the ethylene copolymer (a) comprises copolymerized units of ethylene and copolymerized units of vinyl acetate or alkyl acrylate.

3. The composition of claim 2 wherein the ethylene copolymer (a) comprises copolymerized units of ethylene and from 6 to 40 weight % of copolymerized units of vinyl acetate, methyl acrylate, ethyl acrylate, isobutyl acrylate or n-butyl acrylate.

4. The composition of claim 1 wherein the comonomer providing an amine-reactive site is maleic anhydride copolymer or a monoester of maleic anhydride; or a combination thereof.

5. The composition of claim 4 wherein the comonomer providing an amine-reactive site is in the range of about 8 to about 20 weight % of the copolymer.

6. The composition of claim 5 wherein the comonomer providing an amine-reactive site is ethyl hydrogen maleate in the range of about 10 to about 20 weight % of the copolymer.

7. The composition of claim 5 wherein copolymer (b) is a terpolymer comprising copolymerized units of ethylene, copolymerized units of ethyl hydrogen maleate in the range of about 8 to about 20 weight % of the copolymer and about 1 to about 15 weight % of copolymerized units of alkyl acrylate or vinyl acetate.

8. The composition of claim 1 wherein the copolymer of (b) has a melting point higher than 80° C.

9. The composition of claim 1 further comprising an additional polyolefin polymer comprising homopolymers or copolymers of polyethylene or polypropylene in amounts up to about 30 weight % of the total composition.

10. A composition comprising a blend of
(a) about 20 to about 90 parts by weight of an ethylene copolymer, said ethylene copolymer comprising copolymerized units of ethylene and copolymerized units of a polar comonomer selected from vinyl alkanoate, alkyl methacrylate, alkyl acrylate, carbon monoxide or mixtures thereof, wherein said polar comonomer is present in the copolymer in an amount from about 6 to about 40 weight %; and (d) about 10 to about 80 parts by weight of an ethylene graft copolymer comprising polyetherimide segments, wherein the ethylene graft copolymer is produced from a copolymer comprising copolymerized units of ethylene, copolymerized units of a comonomer providing an amine-reactive site comprising an anhydride group, a vicinal pair of carboxylic groups or a carboxylic group adjacent to an alkoxycarbonyl group, wherein the alkoxy group contains up to 20 carbon atoms, and optionally copolymerized units of a third comonomer; and at least one side chain linked to said amine-reactive sites through imide linkages, said side chain being derived from a short chain polymer having from about 5 to 50 repeat units and containing one primary amine active amine site, the remainder of the short chain polymer being substantially unreactive with the amine-reactive sites and said short chain polymer further comprising copolymerized propylene oxide, copolymerized ethylene oxide, or a mixture of copolymerized propylene oxide and copolymerized ethylene oxide; wherein the total of (a) and (d) is from 100 to 130 parts by weight.

11. The composition of claim 10, wherein the ethylene graft copolymer (d) has a mole % X of side chains linked to the amine-reactive sites and a mole % Y of the comonomer providing an amine-reactive site in the copolymer, such that the ratio X/Y is from about 0.1 to about 0.9.

12. The composition of claim 11 wherein the ratio X/Y is from 0.2 to 0.8.

13. The composition of claim 11 wherein the ratio X/Y is from 0.3 to 0.7.

14. A process for preparing the composition of claim 10 comprising
(1) providing the ethylene copolymer (a), wherein the polar comonomer comprises a vinyl alkanoate, alkyl acrylate or alkyl methacrylate;
(2) providing the copolymer;
(3) providing the short chain polymer, said short chain polymer comprising copolymerized polyethylene oxide;
(4) heating and mixing the ethylene copolymer (a), the copolymer, and the short chain polymer, for about 15 seconds to about 60 minutes, to produce the blend.

* * * * *